(12) United States Patent
Hashimoto et al.

(10) Patent No.: US 11,199,246 B2
(45) Date of Patent: Dec. 14, 2021

(54) AUTOMATIC TRANSMISSION

(71) Applicant: Mazda Motor Corporation, Hiroshima (JP)

(72) Inventors: Akira Hashimoto, Aki-gun (JP); Yasuo Miura, Aki-gun (JP); Takeyuki Tanaka, Aki-gun (JP); Tomoya Nakano, Aki-gun (JP); Kazuhiro Yamada, Aki-gun (JP); Hiroyuki Enoki, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/033,304

(22) Filed: Sep. 25, 2020

(65) Prior Publication Data

US 2021/0116004 A1    Apr. 22, 2021

(30) Foreign Application Priority Data

Oct. 18, 2019    (JP) .............................. JP2019-191073

(51) Int. Cl.
    *F16H 3/44*    (2006.01)
(52) U.S. Cl.
    CPC ......... *F16H 3/44* (2013.01); *F16H 2200/006* (2013.01); *F16H 2200/2012* (2013.01); *F16H 2200/2043* (2013.01)
(58) Field of Classification Search
    CPC ...................................................... F16H 3/44
    See application file for complete search history.

(56) References Cited

U.S. PATENT DOCUMENTS

| 2016/0160964 A1* | 6/2016 | Sugiura | ................... F16H 3/666 475/204 |
| 2018/0306307 A1* | 10/2018 | Kishimoto | .......... F16H 57/0423 |
| 2019/0178271 A1 | 6/2019 | Takashi et al. | |

FOREIGN PATENT DOCUMENTS

JP    2019104018 A    6/2019

* cited by examiner

*Primary Examiner* — Derek D Knight
(74) *Attorney, Agent, or Firm* — Alleman Hall Creasman & Tuttle LLP

(57) ABSTRACT

An automatic transmission which includes a first rotating member and a second rotating member is provided. The first rotating member includes an outer rotating member having a first outer power transmission part and an outer extending part, and an inner rotating member which is made of a different material from the outer rotating member and has a first inner power transmission part and an inner extending part. The outer and inner extending parts are coupled through a first extending part formed by axially joining them to each other at a caulking part. The second rotating member includes a second extending part having a recess indented on an opposite side of the first extending part. The caulking part has a protrusion protruding by being recessed from the first extending part to the second extending part. At least a part of the protrusion is located inside the recess.

20 Claims, 5 Drawing Sheets

|  | CL1 | CL2 | CL3 | BR1 | BR2 |
|---|---|---|---|---|---|
| 1ST GEAR | O |  |  | O | O |
| 2ND GEAR |  | O |  | O | O |
| 3RD GEAR | O | O |  |  | O |
| 4TH GEAR |  | O | O |  | O |
| 5TH GEAR | O |  | O |  | O |
| 6TH GEAR | O | O | O |  |  |
| 7TH GEAR | O |  | O | O |  |
| 8TH GEAR |  | O | O | O |  |
| REVERSE GEAR |  |  | O | O | O |

FIG. 2

AUTOMATIC TRANSMISSION

TECHNICAL FIELD

The present disclosure relates to an automatic transmission.

BACKGROUND OF THE DISCLOSURE

Generally, automatic transmissions mounted on vehicles each include a transmission gear mechanism, and a friction engagement device which realizes a plurality of gear stages by switching a power transmission path of the transmission gear mechanism. The friction engagement device includes a clutch which connects and disconnects power between a pair of rotating elements, and a brake which locks rotation of one of the rotating elements.

The clutch is a multiple-disk clutch having a plurality of friction plates, and is provided with, as rotating members, a drum member and a hub member. The drum member spline engages with some of the friction plates at an outer circumference thereof so that the friction plates are axially movable, and is coupled to a given rotating element of the transmission. The hub member spline engages the remaining friction plates at an inner circumference thereof so that the friction plates are axially movable, and is coupled to another given rotating element of the transmission. Moreover, although the brake has a similar configuration as the clutch, the brake is different in that one of the drum member and the hub member is fixed to a transmission case.

In recent years, in order to improve the fuel efficiency of the vehicle, reducing the weight of the automatic transmission by using an aluminum-based material for the rotating members has been considered. However, in many cases, a power transmission part of the rotating members, which transmits and receives power to and from the rotating elements, is provided on the rotational center shaft side of the transmission, and thus, a tangential load of the power transmission part is larger than that of the outer circumferential side with which the friction plates are spline-engaged. Therefore, the strength may be insufficient if the power transmission part is made of aluminum.

On the other hand, it may be considered to form the power transmission part from a ferrous material and form other parts from an aluminum-based material, and join these parts together. However, since it is difficult to join parts made of different materials (ferrous and aluminum-based materials) by welding, it may be considered, for example, to join these parts at a caulking part by using mechanical clinching, as disclosed in JP2019-104018A.

The caulking part for the mechanical clinching is formed with a protrusion which protrudes by recessing one of the members toward the other member. As a result, a joining part which is formed by joining one member and the other member is increased in the dimension at the part where the protrusion is formed. Particularly, when the caulking part is formed by recessing in the axial direction of the automatic transmission, the size of the automatic transmission increases in the axial direction.

SUMMARY OF THE DISCLOSURE

The present disclosure is made in view of the above situation, and one purpose thereof is to provide an automatic transmission, which is capable of suppressing a dimensional increase in an axial direction, while forming a rotating member which constitutes a part of a clutch or a brake by axially joining members made of different materials at a caulking part via mechanical clinching.

In order to solve the above problems, the present disclosure is configured as described below.

According to one aspect of the present disclosure, an automatic transmission is provided, which includes a first rotating member configured to transmit power between a first pair of members including at least one rotating element, and a second rotating member configured to transmit power between a second pair of members including at least one rotating element. The first rotating member includes an outer rotating member and an inner rotating member located radially inward of the outer rotating member. The outer rotating member has a first outer power transmission part configured to give and receive power to and from one of the first pair of members at a circumferential part formed in a cylindrical shape, and an outer extending part extending radially inward from the first outer power transmission part. The inner rotating member is made of a different material from the outer rotating member, and has a first inner power transmission part configured to give and receive power to and from the other member of the first pair of members, and an inner extending part extending radially outward from the first inner power transmission part. The outer extending part and the inner extending part of the first rotating member are coupled through a first extending part formed by joining the outer extending part and the inner extending part to each other in an axial direction of the automatic transmission at a caulking part via mechanical clinching. The second rotating member includes a second outer power transmission part configured to give and receive power to and from one of the second pair of members at a circumferential part formed in a cylindrical shape, a second inner power transmission part located radially inward of the second outer power transmission part and configured to give and receive power to and from the other member of the second pair of members, and a second extending part extending radially inward from the second outer power transmission part and continuing to the second inner power transmission part. The first extending part and the second extending part are adjacent to each other in the axial direction. The caulking part has a protrusion protruding by being recessed from the first extending part toward the second extending part. The second extending part has a recess indented on an opposite side of the first extending part. At least a part of the protrusion is located inside the recess.

According to the present disclosure, the first rotating member can be formed by appropriately joining the outer rotating member and the inner rotating member, which are made of different materials, at the caulking part. By forming the first rotating member with different materials, since the first rotating member can be set so that each part is made of the suitable material, it is possible to reduce weight, while securing strength. In addition, since the outer rotating member and the inner rotating member can be joined without accompanying, for example, formation of spline-engagement teeth and without using subsidiary materials, the cost can be reduced.

Moreover, although the protrusion is formed in the caulking part of the first extending part, which joins the outer extending part and the inner extending part, at least a part of the protrusion is located inside the recess formed in the second extending part. Thus, the first extending part can be disposed close to the second extending part, while preventing the protrusion of the caulking part from interfering with the second extending part. Therefore, it is easy to dispose the first rotating member close to the second rotating member in the axial direction to reduce the size of the automatic transmission in the axial direction.

A specific gravity of the outer rotating member may be less than a specific gravity of the inner rotating member.

According to this configuration, inertia of the first rotating member can be easily reduced. Therefore, for example, when the automatic transmission is mounted on a vehicle and is used for changing the gear ratio of the output from an internal combustion engine, the fuel efficiency of the vehicle can be improved.

The outer rotating member may be made of an aluminum-based material, and the inner rotating member may be made of a ferrous material.

According to this configuration, since the outer rotating member is located radially outward, it is possible to increase torsional resistance, and the torsional resistance can be secured even if the outer rotating member is made of the aluminum-based material which is relatively low in material strength. On the other hand, since the inner rotating member is located radially inward, it is difficult to increase the torsional resistance, and the torsional resistance is secured by using the ferrous material which is relatively high in material strength. Therefore, it is possible to reduce the inertia while securing the torsional resistance of the first rotating member.

The caulking part may be recessed from one of the outer rotating member and the inner rotating member having a higher shearing strength toward the other of the outer rotating member and the inner rotating member having a lower shearing strength.

According to this configuration, the caulking part is constituted by the one member with the relatively high shearing strength being embedded into the recess formed in the other member. Here, the torsional torque to the first rotating member acts as a force in a shear direction to the embedded part. Therefore, by the part which is embedded in the caulking part being constituted by the one member with the relatively high shearing strength, the strength of the caulking part in the shear direction can be easily improved, and the torsional resistance of the caulking part can be easily increased.

The caulking part may be recessed from one of the outer extending part and the inner extending part having a higher coefficient of thermal expansion toward the other of the outer extending part and the inner extending part having a lower coefficient of thermal expansion.

According to this configuration, the caulking part is constituted by the one member with a relatively high coefficient of thermal expansion being embedded into the recess formed in the other member. Therefore, when the temperature increases, since a thermal expansion allowance of the part embedded into the recess can be increased as compared with a thermal expansion allowance of the recess, it is possible to reduce or prevent rattling or detachment of the caulking part due to the difference in the thermal expansion amount.

At least a part of the first extending part other than the caulking part may also overlap with the recess in the axial direction.

According to this configuration, since the first extending part can be disposed closer to the second extending part, the automatic transmission can be reduced in size in the axial direction.

A power transmission member may be disposed radially inward of the second outer power transmission part, and at least a part of the recess may overlap with the power transmission member in the axial direction.

According to this configuration, the second rotating member can be disposed close to the power transmission member in the axial direction, while providing the recess in the second extending part. Therefore, the automatic transmission can be further reduced in size in the axial direction.

The power transmission member may be a carrier of a planetary gear set.

According to this configuration, the present disclosure is suitably implementable when the power transmission member is the carrier of the planetary gear set. That is, the second extending part can be disposed close to the planetary gear set in the axial direction.

The planetary gear set may have a constituent member made of the same kind of material as the second extending part. The second extending part may be joined to the constituent member by welding.

According to this configuration, since the second extending part and the constituent member of the planetary gear set are made of the same kind of materials, they can be easily joined without using other joining methods, such as spline engagement.

The constituent member may be a ring gear.

According to this configuration, the present disclosure is suitably implementable when the constituent member of the planetary gear set is the ring gear.

The first extending part and the second extending part may be located between the planetary gear set and a brake.

According to this configuration, since the first extending part and the second extending part are located close to the planetary gear set in the axial direction, the brake can be disposed axially close to the planetary gear set. Therefore, the automatic transmission can be further reduced in size in the axial direction.

BRIEF DESCRIPTION OF DRAWINGS

FIG. 2 is an engagement table of friction engagement elements of the automatic transmission.

DETAILED DESCRIPTION OF THE DISCLOSURE

Hereinafter, one embodiment of the present disclosure is described with reference to the accompanying drawings.

Figure 1:
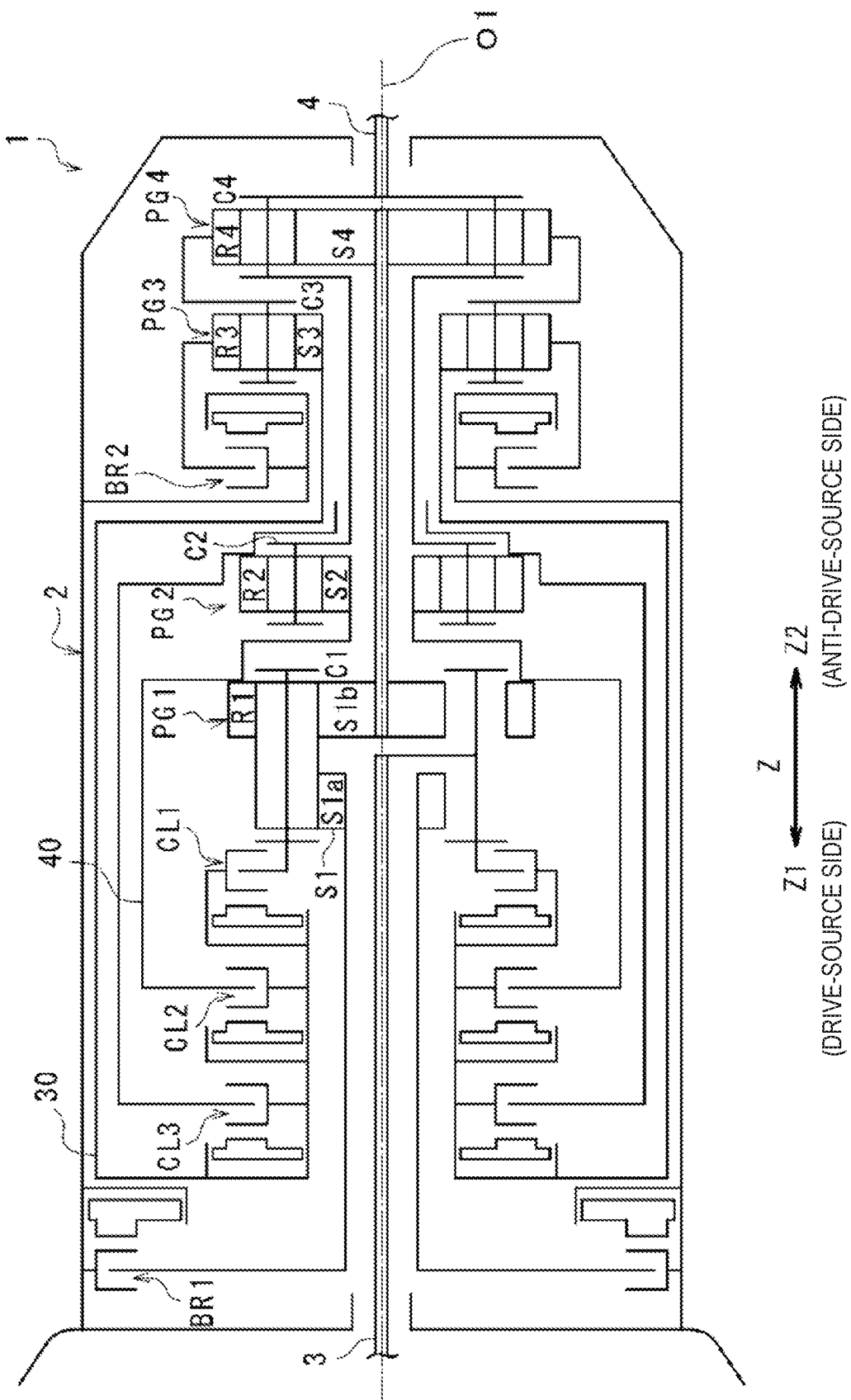
FIG. 1 is a schematic illustration of an automatic transmission according to one embodiment of the present disclosure.

FIG. 1 is a schematic illustration of an automatic transmission according to one embodiment of the present disclosure. This automatic transmission 1 has, inside a transmission case 2, an input shaft 3 which is coupled to a drive source and disposed at a drive-source side (left side in this drawing), and an output shaft 4 disposed at an anti-drive-source side (right side in this drawing). The automatic transmission 1 is a longitudinal type for front-engine rear-drive vehicles in which the input shaft 3 and the output shaft 4 are disposed on the same axis O1. In the following description, a direction in which the axis O1 extends is referred to as an "axial direction Z," a direction toward the drive-source side in the axial direction Z is referred to as an "axial direction Z1," and a direction toward the anti-drive-source side is referred to as an "axial direction Z2."

On the axis of the input shaft 3 and the output shaft 4, first, second, third, and fourth planetary gear sets (hereinafter, simply referred to as "first, second, third, and fourth gear sets") PG1, PG2, PG3, and PG4 are disposed in this order in the axial direction Z2 side.

Inside the transmission case 2, a first clutch CL1, a second clutch CL2, and a third clutch CL3 are disposed in this order in the axial direction Z1 of the first gear set PG1. A first brake BR1 is disposed on the axial direction Z1 side of the third clutch CL3. A second brake BR2 is disposed between the third gear set PG3 and the second gear set PG2.

Each of the first, second, third, and fourth gear sets PG1, PG2, PG3, and PG4 is of a single pinion type in which a pinion supported by a carrier directly meshes with a sun gear and a ring gear. The first, second, third, and fourth gear sets PG1, PG2, PG3, and PG4 have sun gears S1, S2, S3, and S4, ring gears R1, R2, R3, and R4, and carriers C1, C2, C3, and C4, as rotating elements, respectively.

The first gear set PG1 is of a double sun gear type in which the sun gear S1 is divided into two in the axial direction. The sun gear S1 has a first sun gear S1$a$ disposed at the axial direction Z1 side, and a second sun gear S1$b$ disposed at the axial direction Z2 side. The first and the second sun gears S1$a$ and S1$b$ have the same number of teeth, and mesh with the same pinion supported by the carrier C1. Therefore, the first and second sun gears Sla and S1$b$ carry out the same rotation.

In the automatic transmission 1, the sun gear S1 of the first gear set PG1 (in detail, the second sun gear S1$b$) is coupled to the sun gear S4 of the fourth gear set PG4. The ring gear R1 of the first gear set PG1 is coupled to the sun gear S2 of the second gear set PG2. The carrier C2 of the second gear set PG2 is coupled to the carrier C4 of the fourth gear set PG4. The carrier C3 of the third gear set PG3 is coupled to the ring gear R4 of the fourth gear set PG4.

The input shaft 3 is coupled to the carrier C1 of the first gear set PG1 through between the first sun gear Sla and the second sun gear S1$b$. The output shaft 4 is coupled to the carrier C4 of the fourth gear set PG4.

The first clutch CL1 is disposed between the input shaft 3 and the carrier C1 of the first gear set PG1, and the sun gear S3 of the third gear set PG3 to engage and disengage therebetween. The second clutch CL2 is disposed between the ring gear R1 of the first gear set PG1 and the sun gear S2 of the second gear set PG2, and the sun gear S3 of the third gear set PG3 to engage and disengage therebetween. The third clutch CL3 is disposed between the ring gear R2 of the second gear set PG2 and the sun gear S3 of the third gear set PG3 to engage and disengage therebetween.

The first brake BR1 is disposed between the transmission case 2 and the sun gear S1 of the first gear set PG1 (in detail, the first sun gear Sla) to engage and disengage therebetween. The second brake BR2 is disposed between the transmission case 2 and the ring gear R3 of the third gear set PG3 to engage and disengage therebetween.

As illustrated in FIG. 2, according to the above structure, the automatic transmission 1 engages in one of a first to eighth gear in a D range and a reverse gear in an R range by a combination of engagement states of the first clutch CL1, the second clutch CL2, the third clutch CL3, the first brake BR1, and the second brake BR2.

Figure 3:
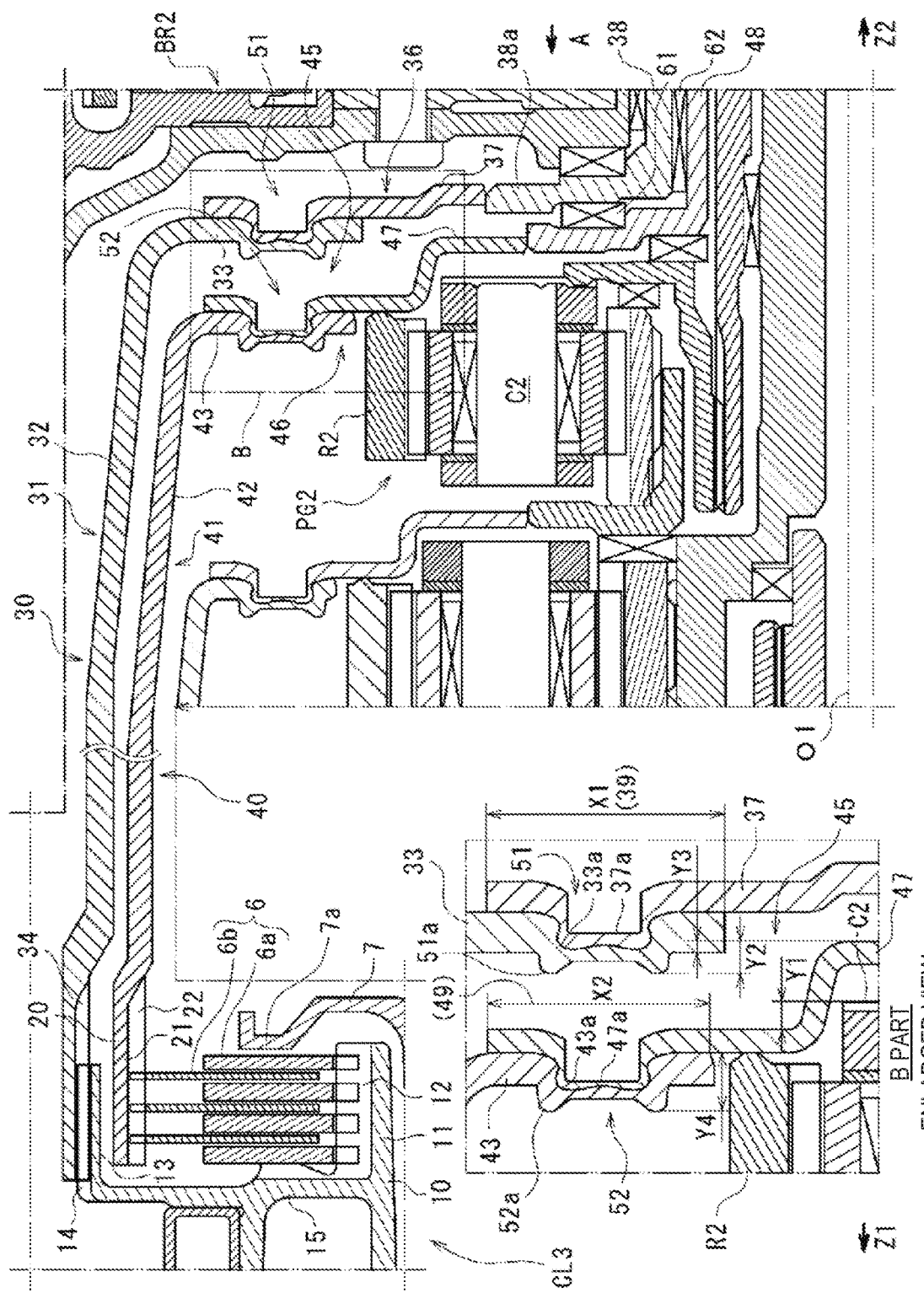
FIG. 3 is a cross-sectional view of a third clutch and the periphery thereof.

FIG. 3 is a cross-sectional view illustrating the periphery of the third clutch CL3 and the second gear set PG2, where only one side of the automatic transmission 1 in the radial direction with respect to the input shaft 3 (see FIG. 1) is illustrated (upper part in FIG. 1).

As illustrated in FIG. 3, the third clutch CL3 includes a clutch hub 10, a clutch drum 20 disposed coaxially at an outer circumferential side of the clutch hub 10, a plurality of friction plates 6 disposed between the clutch hub 10 and the clutch drum 20 in the radial direction, and a piston part 7 which presses the plurality of friction plates 6 in the axial direction Z1 so that the plurality of friction plates 6 are brought into contact with each other. Moreover, the third clutch CL3 includes a first rotating member 30 which couples the clutch hub 10 to the sun gear S3 of the third gear set PG3 (see FIG. 1), and a second rotating member 40 which couples the clutch drum 20 to the ring gear R2 of the second gear set PG2.

The second rotating member 40 is located radially inward of the first rotating member 30, and is adjacent to the first rotating member 30 in the axial direction Z at a first extending part 39 and a second extending part 49 which will be described later.

The clutch hub 10 has a hub first cylindrical part 11 having a cylindrical shape centering on the axis O1, a hub second cylindrical part 13 located coaxially at an outer circumferential side of the hub first cylindrical part 11, and a hub vertical wall part 15 which radially connects end parts of the hub first cylindrical part 11 and the hub second cylindrical part 13 on the axial direction Z1 side.

In an outer circumferential part of the hub first cylindrical part 11, a hub first spline part 12 with which some of the plurality of friction plates 6 (friction plates 6$a$, hereinafter referred to as "hub-side friction plates") are engaged so as to be movable in the axial direction Z is formed. In an outer circumferential part of the hub second cylindrical part 13, a hub second spline part 14 which gives and receives power to and from the first rotating member 30 is formed.

The clutch drum 20 has a drum cylindrical part 21 located radially outward of the hub first cylindrical part 11 and radially inward of the hub second cylindrical part 13. The drum cylindrical part 21 is formed in a cylindrical shape centering on the axis O1. In an inner circumferential part of the drum cylindrical part 21, a drum spline part 22 with which the remaining friction plates 6$b$ (hereinafter, referred to as "drum-side friction plates") of the plurality of friction plates 6 are engaged so as to be movable in the axial direction Z is formed.

The friction plates 6 are constructed so that the hub-side friction plates 6$a$ and the drum-side friction plates 6$b$ are provided alternately in the axial direction Z. The piston part 7 reciprocates in the axial direction Z by operation hydraulic pressure supplied to a cylinder (not illustrated). When the piston part 7 moves in the axial direction Z1, the plurality of friction plates 6 are pinched between a pressing part 7$a$ at a tip end of the piston part 7 and the hub vertical wall part 15 so that the third clutch CL3 becomes in an engaged state. On the other hand, when the piston part 7 moves in the axial direction Z2, the plurality of friction plates 6 are released from the engaged state, and therefore, the third clutch CL3 becomes in a disengaged state.

The first rotating member 30 has a first outer rotating member 31 located radially outward, and a first inner rotating member 36 located radially inward of the first outer rotating member 31, and these members are joined by mechanical clinching (described later). The first outer rotating member 31 and the first inner rotating member 36 are made of different materials. In detail, the first outer rotating member 31 is made of a material with a relatively low specific gravity (e.g., an aluminum-based material or a magnesium-based material), and the first inner rotating member 36 is made of material with a relatively high specific gravity (e.g., ferrous material).

The first outer rotating member 31 has a first outer cylindrical part 32 extending coaxially with the axis O1, and a first outer extending part 33 which is bent from an end part of the first outer cylindrical part 32 on the axial direction Z2 side, and extends radially inward. Moreover, in an inner circumferential part of an end part of the first outer cylindrical part 32 on the axial direction Z1 side, a first outer spline part 34 which is engaged with the hub second spline part 14 of the clutch hub 10, and gives and receives power to and from the clutch hub 10 is formed. That is, the first outer cylindrical part 32 constitutes a first outer power transmission part according to the present disclosure.

The first inner rotating member 36 has a first inner extending part 37 which extends in the radial direction between the second brake BR2 and the second gear set PG2, and a first inner cylindrical part 38 formed in a cylindrical shape centering on the axis O1. The first inner extending part 37 is a plate-like member which is a wrought product of a ferrous material formed in an annular shape.

The first inner cylindrical part 38 is formed by forging the ferrous material, and has a flange part 38a extending radially at an end part on the axial direction Z1 side. In an outer circumferential part on the axial direction Z2 side, a first inner spline part (not illustrated) which is spline-engaged with an inner circumferential part of the sun gear S3 of the third gear set PG3 (see FIG. 1), and gives and receives power to and from the sun gear S3 is formed. That is, the first inner cylindrical part 38 constitutes a first inner power transmission part according to the present disclosure.

The first inner rotating member 36 is made by abutting welding the first inner extending part 37 and the flange part 38a of the first inner cylindrical part 38 in the radial direction. By constituting the first inner extending part 37 of the first inner rotating member 36 with the simple shape from the drawing material, and constituting the first inner cylindrical part 38 with the complicated shape from the forging material, the entire first inner rotating member 36 is made of the ferrous material, but the manufacturing cost like, for example, the case where the entire first inner rotating member 36 is formed by forging, can be reduced.

As illustrated by a B part enlarged cross-sectional view of FIG. 3, the first inner extending part 37 contacts the first outer extending part 33 from the axial direction Z2 side at a contact area X1. The first outer rotating member 31 and the first inner rotating member 36 are mechanically joined in the axial direction Z at the contact area X1 with a caulking part 51 via mechanical clinching. The first outer extending part 33 and the first inner extending part 37 are joined to each other to constitute the first extending part 39. The first extending part 39 is located between the second brake BR2 and the second gear set PG2 in the axial direction Z, and extends in the radial direction.

The caulking part 51 is recessed from the first inner extending part 37 side to the first outer extending part 33 side (i.e., to the axial direction Z1 side) to be caulked. The caulking part 51 has a protrusion 51a which protrudes to the axial direction Z1 side more than a part of the first outer extending part 33 other than the caulking part 51. The caulking part 51 is formed by a first inner recess 37a where the first inner extending part 37 is recessed to the axial direction Z1 side being embedded into a first outer recess 33a where the first outer extending part 33 is recessed to the axial direction Z1 side.

Figure 4:
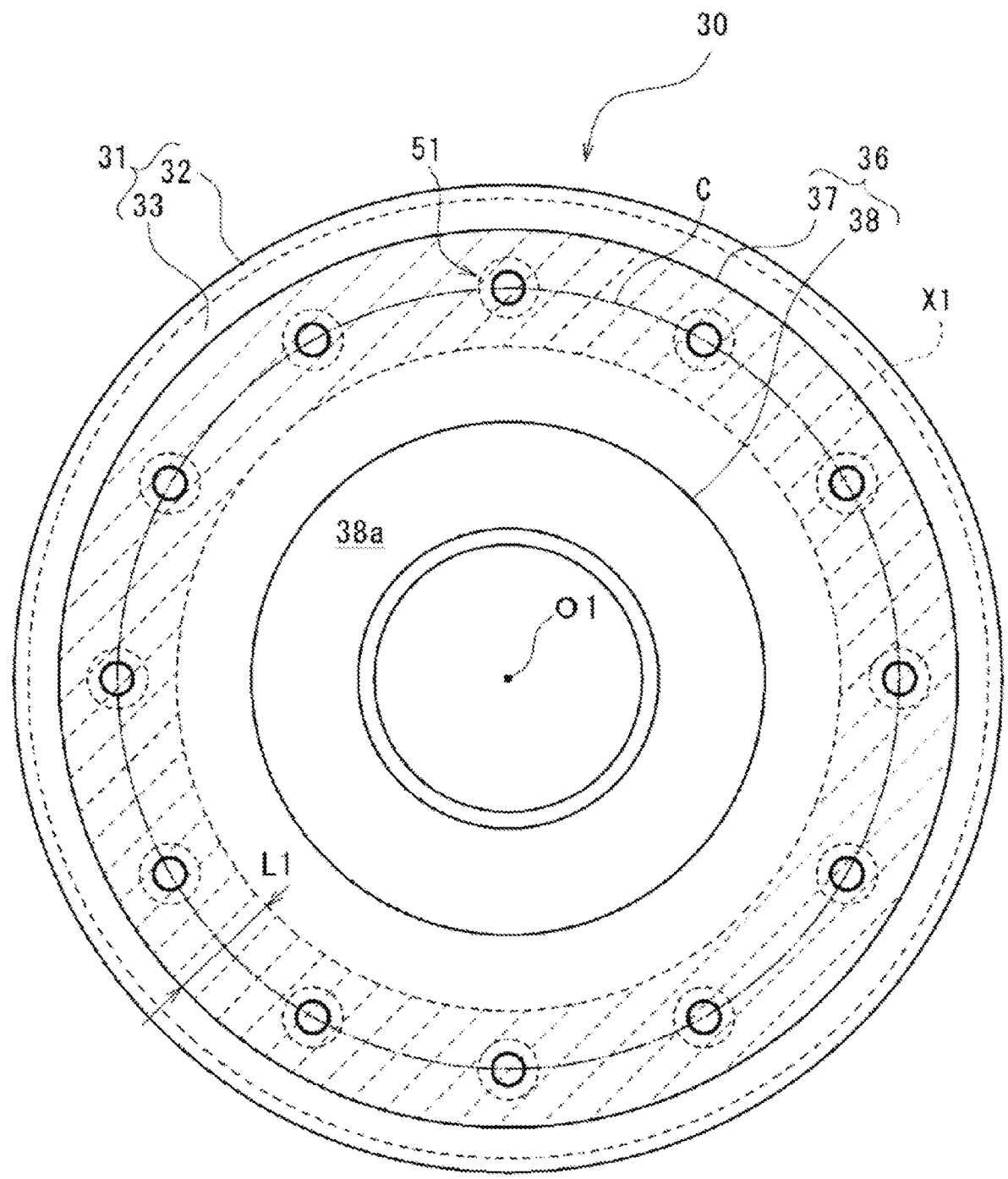
FIG. 4 is a front view of a first rotating member as seen in an A-direction of FIG. 3.

FIG. 4 is a front view of the first rotating member 30 as seen in A-direction of FIG. 3. As illustrated in FIG. 4, the contact area X1, indicated by hatching with dashed lines, is formed in an annular shape having a width or thickness L1 in the radial direction around the axis O1. Caulking parts 51 are formed at a plurality of locations on a virtual circle C which passes through a substantially middle position of the contact area X1 in the radial width L1, at a substantially equal interval.

The number of caulking parts 51 is set in consideration of the joining strength per caulking part 51 against a torsional torque needed between the two rotating elements. Specifically, the number of caulking parts 51 is set in consideration of the strength in a shear direction (rotational direction) of the first inner recess 37a embedded in the first outer recess 33a. In this embodiment, since the first inner recess 37a made of the ferrous material is embedded into the caulking part 51, it is easier to increase the shearing strength at the embedded part, and it is easier to increase the joining strength of the caulking part 51 as compared with a case where the first outer recess 33a made of the aluminum-based material is embedded.

Next the second rotating member 40 is described with reference to FIG. 3. The second rotating member 40 has a similar structure to the first rotating member 30, and has a second outer rotating member 41 which is made of an aluminum-based material and a second inner rotating member 46 which is made of a ferrous material and is located radially inward of the second outer rotating member 41.

The second outer rotating member 41 is formed integrally with the clutch drum 20, and gives and receives power to and from the plurality of drum-side friction plates 6b through the drum spline part 22. Therefore, the second outer rotating member 41 constitutes a second outer power transmission part according to the present disclosure. The second outer rotating member 41 has a second outer cylindrical part 42 which continues from the drum cylindrical part 21 and extends to the axial direction Z2 side, and a second outer extending part 43 which is bent from the end part of the second outer cylindrical part 42 on the axial direction Z2 side and extends radially inward.

The second outer extending part 43 is located on the axial direction Z1 side of the first extending part 39 and overlaps with the ring gear R2 of the second gear set PG2 in the axial direction Z. Moreover, the second outer extending part 43 extends to near the outer diameter part of the ring gear R2 in the radial direction.

The second inner rotating member 46 has a second inner extending part 47 which is made of a drawing material, and a second inner cylindrical part 48 which is made of a forging material, and these are abutted in the radial direction and joined by welding. The second inner extending part 47 extends in the radial direction at the axial direction Z1 side of the first extending part 39.

The second inner cylindrical part 48 is supported by the flange part 38a of the first inner cylindrical part 38 in the axial direction Z1 through a bearing 61, and is rotatably supported by an inner circumferential part of the first inner cylindrical part 38 through a bearing 62.

A recess 45 is formed in a radially outside part of the second inner extending part 47, which is recessed to the axial direction Z1 side in an annular shape centering on the axis O1. The recess 45 is located radially outward of the carrier C2 of the second gear set PG2, and at least a part thereof overlaps with the carrier C2 by a length Y1 in the axial direction Z. Moreover, the recess 45 overlaps with at least a part of the protrusion 51a of the caulking part 51 by a length Y2 in the axial direction Z. Further, the recess 45 overlaps with at least a part of the first outer extending part 33 other than the caulking part 51 by a length Y3 in the axial direction Z.

The second inner extending part 47 contacts the second outer extending part 43 from the axial direction Z2 side at a contact area X2 in a radially outside part of the recess 45. The second outer rotating member 41 and the second inner rotating member 46 are mechanically joined to each other in the axial direction Z at the contact area X2 with the caulking part 52 via mechanical clinching.

The caulking part 52 is caulked, similarly to the caulking part 51, by being recessed from the second inner extending part 47 side to the second outer extending part 43 side (i.e., to the axial direction Z1 side). The caulking part 52 has a protrusion 52a which protrudes to the axial direction Z1 side more than a part of the second outer extending part 43 other than the caulking part 52. The caulking part 52 is formed by a second inner recess 47a where the second inner extending part 47 is recessed to the axial direction Z1 side being embedded into a second outer recess 43a where the second outer extending part 43 is recessed to the axial direction Z1 side.

The second extending part 49 is constituted by joining the second outer extending part 43 and the second inner extending part 47 together. The second extending part 49 overlaps with the ring gear R2 by a length Y4 in the axial direction Z. Moreover, although illustration is omitted, the caulking part 52 is formed at a plurality of locations on a virtual circle which passes through a substantially center position of the radial width in the contact area X2 at a substantially equal interval.

The ring gear R2 is made of the ferrous material which is the same kind of material as the second inner rotating member 46. The second inner extending part 47 is joined to the ring gear R2 from the axial direction Z2 side by welding at a part of the recess 45 radially inward of the contact area X2, and gives and receives power to and from the ring gear R2. Therefore, the part of the second inner extending part 47 radially inward of the recess 45 constitutes a second inner power transmission part according to the present disclosure.

The automatic transmission 1 according to the embodiment described herein has the following effects:

(1) The first rotating member 30 can be constituted by appropriately joining the first outer rotating member 31 and the first inner rotating member 36, which are made of different materials, at the caulking part 51. By constituting the first rotating member 30 with different materials, since the first rotating member 30 can be set so that each part is made of the suitable material, it is possible to reduce the weight, while securing the strength. In addition, since the first outer rotating member 31 and the first inner rotating member 36 can be joined, for example, without accompanying the formation of the spline-engagement teeth and without using subsidiary materials, the cost can be reduced. Note that, although the operation and effects described above are similarly demonstrated in the second rotating member 40, effects of the first rotating member 30 are mainly described in detail below.

Moreover, although the protrusion 51a is formed in the caulking part 51 of the first extending part 39, which joins the first outer extending part 33 to the first inner extending part 37, at least a part of the protrusion 51a is located inside the recess 45 formed in the second extending part 49. Thus, the first extending part 39 can be disposed close to the second extending part 49, while preventing the protrusion 51a of the caulking part 51 from interfering with the second extending part 49. Therefore, it is possible to dispose the first rotating member 30 close to the second rotating member 40 in the axial direction, and it is possible to reduce the size of the automatic transmission 1 in the axial direction Z.

(2) Since the first outer rotating member 31 has a specific gravity that is less than a specific gravity of the first inner rotating member 36, the inertia of the first rotating member 30 can be reduced. Therefore, for example, when the automatic transmission 1 is mounted on a vehicle and is used for changing the gear ratio of the output from an internal combustion engine, the fuel efficiency of the vehicle can be improved.

(3) The first outer rotating member 31 is made of the aluminum-based material, and the first inner rotating member 36 is made of the ferrous material. Therefore, since the first outer rotating member 31 is located radially outward, it is possible to increase torsional resistance, and the torsional resistance can be secured, even if the first outer rotating member 31 is made of an aluminum-based material which is relatively low in the material strength. On the other hand, since the first inner rotating member 36 is located radially inward, it is difficult to increase torsional resistance, and therefore, the torsional resistance is secured by using the ferrous material which is relatively high in the material strength. Therefore, it is possible to reduce the inertia, while securing the torsional resistance of the first rotating member 30.

(4) The caulking part 51 is formed by being recessed from the first inner rotating member 36 which is made of the ferrous material and is relatively high in the shearing strength toward the first outer rotating member 31 which is made of the aluminum-based material and is relatively low in the shearing strength. The caulking part 51 is constituted by the first inner recess 37a with the relatively high shearing strength being embedded into the first outer recess 33a formed in the first outer rotating member 31. Here, the torsional torque to the first rotating member 30 acts as a force in the shear direction to the embedded part. Therefore, by the part which is embedded in the caulking part 51 being constituted by the first inner rotating member 36 with the relatively high shearing strength, the strength of the caulking part 51 in the shear direction can be easily improved, and the torsional resistance of the caulking part 51 can be easily increased.

(5) Since at least the part of the first extending part 39 other than the caulking part 51 also overlaps with the recess 45 in the axial direction Z, the first extending part 39 can be disposed closer to the second extending part 49. Therefore, the automatic transmission 1 can be reduced in size in the axial direction Z.

(6) The second gear set PG2 is disposed radially inward of the second rotating member 40, and at least the part of the recess 45 overlaps with the carrier C2 of the second gear set PG2 in the axial direction Z. The second rotating member 40 can be disposed close to the second planetary gear set PG2 in the axial direction Z, while providing the recess 45 in the second extending part 49. Therefore, the automatic transmission 1 can be reduced in size in the axial direction Z.

(7) The second gear set PG2 has the ring gear R2 made of the ferrous material which is the same kind of material as the second inner rotating member 46, and the second inner extending part 47 of the second inner rotating members 46 is joined to ring gear R2 by welding, at the radially inward part of the recess 45. Since the second inner extending part 47 and the ring gear R2 are made of the ferrous materials which are the same kind of materials, they can be joined easily without using other joining methods, such as spline engagement.

(8) The first extending part 39 and the second extending part 49 are located between the gear set PG2 and the second brake BR2. Since the first extending part 39 and the second extending part 49 are disposed close to the gear set PG2 in the axial direction Z, it is possible for the second brake BR2 to also be disposed close to the gear set PG2 in the axial direction Z. Therefore, the automatic transmission 1 can be reduced in size in the axial direction Z.

Figure 5:
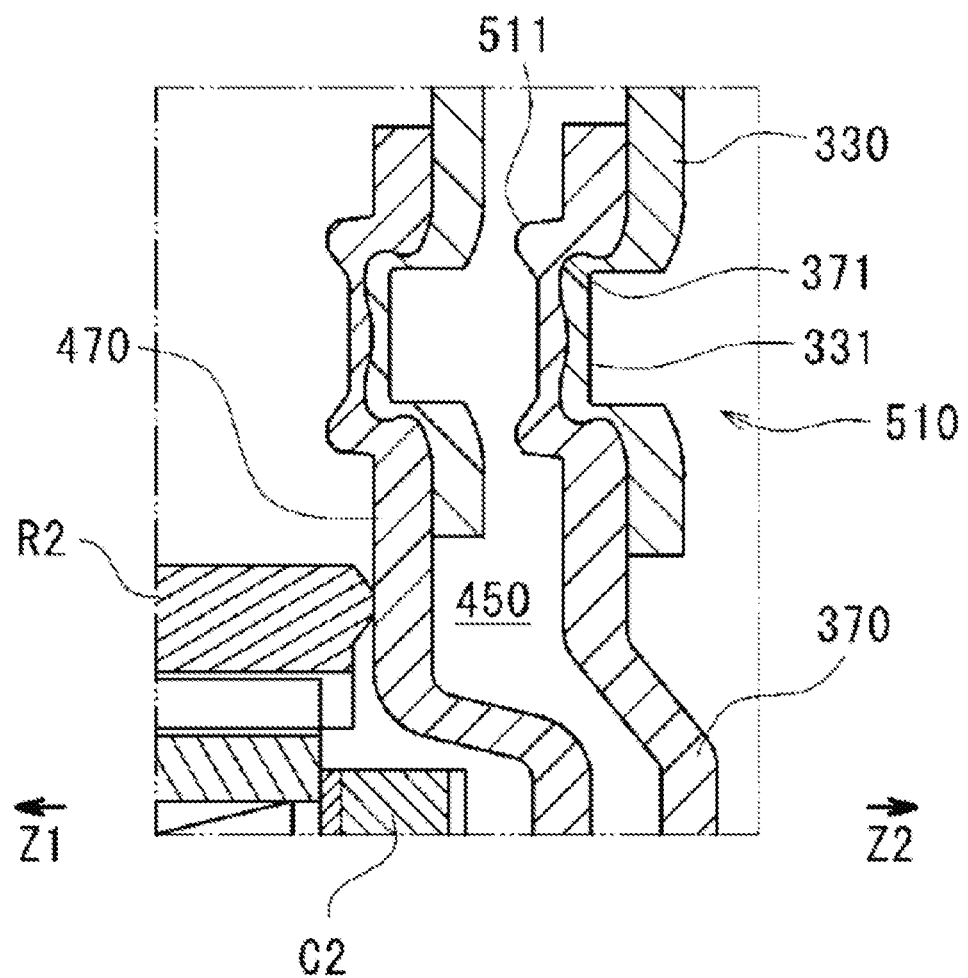
FIG. 5 is a cross-sectional view illustrating a caulking part according to one modification.

Although in this embodiment the caulking part 51 is caulked from the first inner extending part 37 side made of the ferrous material with a relatively high shearing strength to the first outer extending part 33 side made of the aluminum-based material with a relatively low shearing strength, it will be appreciated that the caulking part is not limited to this configuration. As illustrated in FIG. 5, a caulking part 510 may be caulked from a first outer extending part 330 side made of the aluminum-based material with a relatively low shearing strength to a first inner extending part 370 side made of the ferrous material with a high shearing strength.

In this case, the caulking part 510 is caulked from the first outer extending part 330 side made of the aluminum-based material with a relatively high coefficient of thermal expansion to the first inner extending part 370 side made of the ferrous material with a relatively low coefficient of thermal expansion.

As a result, the caulking part 510 is constituted by a first outer recess 331 of the first outer extending part 330 with a relatively high coefficient of thermal expansion being embedded into a first inner recess 371 formed in the first inner extending part 370 with a relatively low coefficient of thermal expansion. Therefore, when the temperature rises, since a thermal expansion allowance of the first outer recess 331 embedded into the first inner recess 371 can be increased as compared with a thermal expansion allowance of the first inner recess 371, it is possible to reduce or prevent rattling or detachment of the caulking part 510 due to the difference in the thermal expansion amount.

Moreover, by altering the spatial relationship between the first outer extending part 330 and the first inner extending part 370 in the axial direction Z, the first outer extending part 330 may contact the first inner extending part 370 from the axial direction Z2 side, a protrusion 511 of the caulking part 510 may protrude to the axial direction Z1 side, and at least a part of the protrusion 511 may overlap with a recess 450 of a second inner extending part 470 in the axial direction Z.

Moreover, although in this embodiment the rotating members which give and receive power between the given rotating element and the third clutch CL3 are the first rotating member 30 and the second rotating member 40, it will be appreciated that the rotating members are not limited to this configuration. For example, the present disclosure may be suitably implemented when the rotating members included in the first clutch CL1, the second clutch CL2, the first brake BR1, and the second brake BR2 are each comprised of a radially outside part and a radially inside part which are made of different materials, these parts are joined at the caulking part via mechanical clinching, and the rotating members are adjacent to each other in the axial direction Z.

As described above, according to the automatic transmission of the present disclosure, the rotating member which constitutes a part of the clutch or the brake is formed by joining members made of different materials in the axial direction at a caulking part via mechanical clinching to reduce the size of the automatic transmission in the axial direction. As such, the technology described herein may be used suitably in the manufacturing technology field of vehicles in which automatic transmissions are mounted.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Automatic Transmission
6 Friction Plate
10 Clutch Hub
20 Clutch Drum
30 First Rotating Member
31 First Outer Rotating Member
33 First Outer Extending Part
36 First Inner Rotating Member
37 First Inner Extending Part
38 First Inner Cylindrical Part
39 First Extending Part
40 Second Rotating Member
41 Second Outer Rotating Member
43 Second Outer Extending Part
45 Recess
46 Second Inner Rotating Member
47 Second Inner Extending Part
48 Second Inner Cylindrical Part
49 Second Extending Part
51, 52 Caulking Part
CL3 Third Clutch
BR2 Second Brake
PG2 Second Gear Set

What is claimed is:

1. An automatic transmission, comprising:
a first rotating member configured to transmit power between a first pair of members including at least one rotating element; and
a second rotating member configured to transmit power between a second pair of members including at least one rotating element,
wherein the first rotating member includes an outer rotating member and an inner rotating member located radially inward of the outer rotating member,
wherein the outer rotating member has a first outer power transmission part configured to give and receive power to and from one of the first pair of members at a circumferential part formed in a cylindrical shape, and an outer extending part extending radially inward from the first outer power transmission part,
wherein the inner rotating member is made of a different material from the outer rotating member, and has a first inner power transmission part configured to give and receive power to and from the other member of the first pair of members, and an inner extending part extending radially outward from the first inner power transmission part,
wherein the outer extending part and the inner extending part of the first rotating member are coupled through a first extending part formed by joining the outer extending part and the inner extending part to each other in an axial direction of the automatic transmission at a caulking part via mechanical clinching, wherein the second rotating member includes:
a second outer power transmission part configured to give and receive power to and from one of the second pair of members at a circumferential part formed in a cylindrical shape;
a second inner power transmission part located radially inward of the second outer power transmission part and configured to give and receive power to and from the other member of the second pair of members; and
a second extending part extending radially inward from the second outer power transmission part and continuing to the second inner power transmission part,
wherein the first extending part and the second extending part are adjacent to each other in the axial direction,
wherein the caulking part has a protrusion protruding by being recessed from the first extending part toward the second extending part,
wherein the second extending part has a recess indented on an opposite side of the first extending part, and
wherein at least a part of the protrusion is located inside the recess.

2. The automatic transmission of claim 1, wherein a specific gravity of the outer rotating member is less than a specific gravity of the inner rotating member.

3. The automatic transmission of claim 1, wherein the outer rotating member is made of an aluminum-based material, and the inner rotating member is made of a ferrous material.

4. The automatic transmission of claim 1, wherein the caulking part is recessed from one of the outer rotating member and the inner rotating member having a higher shearing strength toward the other of the outer rotating member and the inner rotating member having a lower shearing strength.

5. The automatic transmission of claim 1, wherein the caulking part is recessed from one of the outer extending part and the inner extending part having a higher coefficient of thermal expansion toward the other of the outer extending part and the inner extending part having a lower coefficient of thermal expansion.

6. The automatic transmission of claim 1, wherein at least a part of the first extending part other than the caulking part also overlaps with the recess in the axial direction.

7. The automatic transmission of claim 1,
wherein a power transmission member is disposed radially inward of the second outer power transmission part, and
wherein at least a part of the recess overlaps with the power transmission member in the axial direction.

8. The automatic transmission of claim 7, wherein the power transmission member is a carrier of a planetary gear set.

9. The automatic transmission of claim 8,
wherein the planetary gear set has a constituent member made of the same kind of material as the second extending part, and
wherein the second extending part is joined to the constituent member by welding.

10. The automatic transmission of claim 9, wherein the constituent member is a ring gear.

11. The automatic transmission of claim 8, wherein the first extending part and the second extending part are located between the planetary gear set and a brake.

12. The automatic transmission of claim 2, wherein the outer rotating member is made of an aluminum-based material, and the inner rotating member is made of a ferrous material.

13. The automatic transmission of claim 2, wherein the caulking part is recessed from one of the outer rotating member and the inner rotating member having a higher shearing strength toward the other of the outer rotating member and the inner rotating member having a lower shearing strength.

14. The automatic transmission of claim 2, wherein the caulking part is recessed from one of the outer extending part and the inner extending part having a higher coefficient of thermal expansion toward the other of the outer extending part and the inner extending part having a lower coefficient of thermal expansion.

15. The automatic transmission of claim 3, wherein the caulking part is recessed from one of the outer rotating member and the inner rotating member having a higher shearing strength toward the other of the outer rotating member and the inner rotating member having a lower shearing strength.

16. The automatic transmission of claim 3, wherein the caulking part is recessed from one of the outer extending part and the inner extending part having a higher coefficient of thermal expansion toward the other of the outer extending part and the inner extending part having a lower coefficient of thermal expansion.

17. The automatic transmission of claim 4, wherein the caulking part is recessed from one of the outer extending part and the inner extending part having a higher coefficient of thermal expansion toward the other of the outer extending part and the inner extending part having a lower coefficient of thermal expansion.

18. The automatic transmission of claim 5, wherein at least a part of the first extending part other than the caulking part also overlaps with the recess in the axial direction.

19. The automatic transmission of claim 5,
wherein a power transmission member is disposed radially inward of the second outer power transmission part, and
wherein at least a part of the recess overlaps with the power transmission member in the axial direction.

20. The automatic transmission of claim 6,
wherein a power transmission member is disposed radially inward of the second outer power transmission part, and
wherein at least a part of the recess overlaps with the power transmission member in the axial direction.

* * * * *